Oct. 31, 1972  H. KEINER ET AL  3,701,597

MOVIE CAMERA WITH CAM-DRIVEN GRIPPER

Filed March 6, 1972

United States Patent Office 3,701,597
Patented Oct. 31, 1972

3,701,597
MOVIE CAMERA WITH CAM-DRIVEN GRIPPER
Heinz Keiner, Oberndorf, and Wilhelm Schafer, Wetzlar, Germany, assignors to Ernst Leitz G.m.b.H., Wetzlar, Germany
Filed Mar. 6, 1972, Ser. No. 231,926
Claims priority, application Germany, Mar. 11, 1971,
P 21 11 703.3
Int. Cl. G03b 1/22
U.S. Cl. 352—194        3 Claims

ABSTRACT OF THE DISCLOSURE

In a movie camera the cam-driven gripper is under the influence of spring means for eliminating the play in the gearing between the driving motor and the gripper. The spring means comprise a first and a second spring. Both springs are arranged symmetrically to the gripper path. The first spring acts on the gripper only at the end of the down stroke and the second spring acts on the gripper only at the end of the up stroke. It is thereby achieved that the gripper is not under a spring load in its rest position and during most of its travel, and still the advantage of the spring influence, i.e. a good picture steadiness is maintained.

BACKGROUND OF THE INVENTION

The invention relates to movie cameras and in particular to those which comprise a cam-driven gripper.

Cam-driven grippers are well known to those skilled in the art. The cam is usually arranged on the rotating shaft of the sector shutter and either has the shape of a lobed cylinder of which all diameters have equal lengths or it is a circular disc which is arranged excentrically on the shaft. The play existing between the cam surface and the gripper is usually suppressed by means of a spring which acts on the gripper in a direction opposite to the direction of the gripper working stroke. The spring influences the gripper throughout all of its working stroke and is decisive for a good picture steadiness.

The action of the spring throughout all of the stroke, however, has certain disadvantages, for example, as far as the motor drive is concerned. On the other hand it is quite unnecessary to have a spring exerting its force on the gripper all along its down stroke (which is the working stroke) because a good picture steadiness is only required when the sector shutter uncovers the image aperture which is in the lower end position of the gripper tooth. During the rest of the gripper path the effect of the spring is quite undesired because the spring increases the bounce of the sector shutter when the shutter abuts against the stop member at the end of a picture taking sequence and also the spring enlarges the unsymmetrical motor load during the camera run.

It is, therefore, an object of the invention to provide a gripper mechanism comprising a spring which acts on the gripper only at the end of the gripper working stroke in order to achieve a good picture steadiness. It is a further object to provide a spring loaded gripper mechanism in which the spring does not increase the bounce of the shutter in its stopping position. And it is another object to provide a gripper mechanism wherein the spring load affects the motor symmetrically during camera run.

SUMMARY OF THE INVENTION

According to the invention the above stated objects are attained by arranging a first spring and a second spring symmetrically to the gripper path. The first spring acts on the gripper only at the end of the down stroke while the second spring acts on the gripper only at the end of the up stroke.

As a consequence of this arrangement the gripper travels throughout nearly all of its path without being influenced by a spring. This cuts considerably the force required for film transportation compared to prior art cameras. Only short of the end of its down stroke the gripper engages the first spring and compresses it slightly. This serves to steady the gripper movement and gives a good picture steadiness. The spring still acts on the gripper when the latter is withdrawn from the film perforation and releases during the first moments of the up stroke.

The second spring is engaged by the gripper just short of the end of the gripper up stroke. The spring is compressed and then again released during the first moment of the down stroke. Since this is at the same time the first moment of film transportation the second spring thus supports the motor drive.

However, the arrangement of the first and second spring must be thus that in the stopping position of the gripper and the shaft of the sector shutter the springs do not act on the gripper. This is necessary in order to prevent the shaft, which is in a driving engagement with the gripper, from being pressed against the stop member by the second spring. Pressing the shaft against the stop member by a resilient force would require an extra power for removing the stop member out of the path of the shaft. Since the stop member is often pulled out of the way by a solenoid an extra strong solenoid would then have to be installed. Besides, the conditions for the beginning of the rotation are much improved if the gripper and the shaft are not under a spring load. Without this load the shaft can much quicker reach the regular number of r.p.m. which is important for the correct exposure of the first pictures in every scene.

Further, the arrangement of the second spring has the advantage that the driving motor is under a small second load which is symmetrically spaced from the first load during one complete shaft rotation which includes always one down stroke and one up stroke of the gripper. This provides a steadier run of the motor and better electrical conditions for the motor speed control.

In addition it is suggested to mount the first and second spring not completely released, but to keep both under a certain equal pre-stress. It is thereby achieved that the power of the spring which is required for a good picture steadiness will be obtained by compressing the springs only through a short distance.

BRIEF DESCRIPTION OF THE DRAWINGS

The invention will be more readily comprehended from the following description when taken in conjunction with the appended drawings, wherein.

DESCRIPTION OF THE PREFERRED EMBODIMENT

Figure 1:
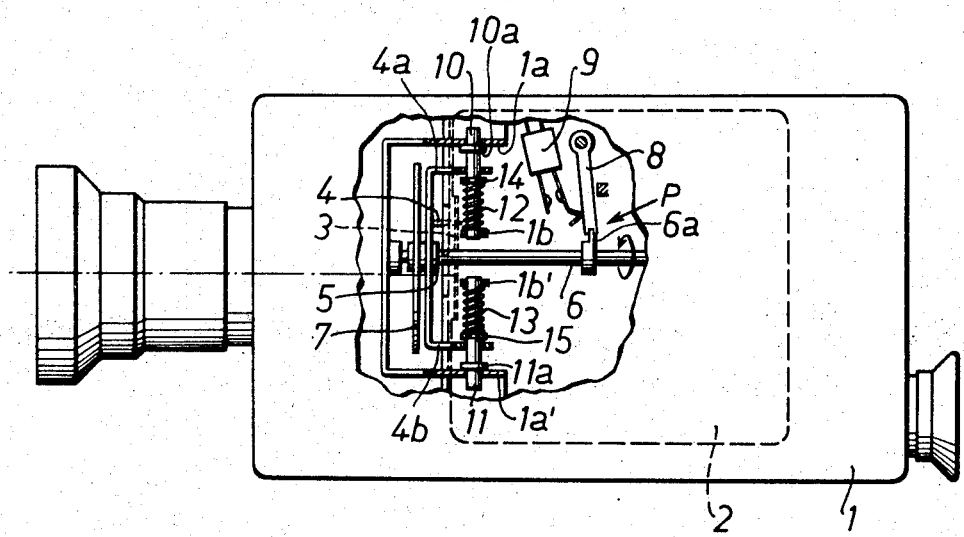
FIG. 1 shows schematically a movie camera with the housing partially cut away.

Referring now to the drawings, a movie camera 1 is loaded with a cartridge 2 containing a film 3. The film perforation is engaged by a gripper 4 which is driven in a known manner by a cam 5. The cam 5 rotates during camera run and causes the gripper to execute down strokes and up strokes and which, further, brings the gripper tooth into engagement with the film perforation and withdraws it therefrom.

The cam 5 is stationary on a shaft 6 which also carries a sector shutter 7. Further, a lug 6a projects from the shaft 6 which lug cooperates with a stop member 8. The latter is actuated by a solenoid 9 which pulls the stop member out of the path of the lug 6a for releasing the camera.

Figure 2:
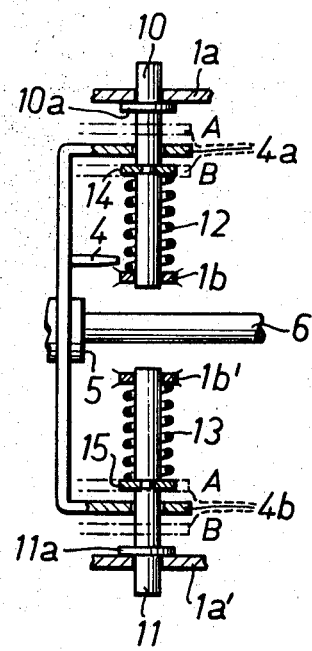
FIG. 2 is an enlarged partial view of the gripper.

From FIG. 2 it will be readily discerned that the gripper comprises an upper arm 4a and a lower arm 4b which are mounted on shafts 10; 11 respectively. The shafts 10; 11 are mounted between housing walls 1a; 1b; 1a'; 1b' and rest with a shoulder 10a; 11a respectively against the walls 1a; 1a'. On the shaft 10 is provided a first compression spring 12 and on the shaft 11 is provided a second compression spring 13. The springs are respectively suspended between the walls 1b; 1b' on the one side and snap rings 14; 15 on the other side.

During its up and down strokes between the positions A and B shown in dotted lines the gripper arms 4a, 4b abut alternatively against the snap rings 14, 15 so that the gripper works during the end phase of its working stroke (from A to B) against the first compression spring 12 and during the end phase of its up stroke (from B to A) against the second compression spring 13. The shafts 10; 11 are thereby moved in the direction of the shaft 6 through a distance equal to the spring compression. As has already been mentioned the abutting of the gripper arm 4a against the snap ring 14 at the end of the working stroke brings about a good picture steadiness while the abutting of the gripper arm 4b against the snap ring 15 at the end of the up stroke serves mainly for distributing the motor load equally during one rotation.

From FIG. 2 it will also readily be realized that the gripper is only under the influence of the spring means at the end of its up stroke and down stroke respectively. During the main length of its path the gripper travels free from the spring load and from the friction caused thereby. This is a considerable improvement over the prior art cameras and is of particular importance in the stopping position of the sector shutter. This stopping position is located at about half the distance between the upper and the lower dead center of the gripper path. In this position the gripper is also not under a spring force. As a consequence thereof the lug 6a rests against the stop member 8 without any friction and the latter can be pulled out of the way of the lug 6a by a very small force, such as can be provided by the solenoid 9.

What is claimed is:

1. A movie camera with a cam-driven gripper for film transportation and with a sector shutter on a shaft, rotated by a motor, wherein the improvement comprises
    (a) a first spring means arranged in the camera to be engaged by the gripper during the end phase of its down stroke (working stroke), and
    (b) a second spring means arranged in the camera to be engaged by the gripper during the end phase of its up stroke,
the first spring means ensuring a good picture steadiness when said gripper is in its lower end position and the second spring means ensuring an even distribution of the motor load.

2. A movie camera as claimed in claim 1, wherein the first and second spring means are compression springs mounted symmetrically to the shutter shaft on a first and a second shaft extending substantially perpendicular to the shutter shaft and serving as guiding means for the gripper.

3. A movie camera as claimed in claim 1, wherein the first and the second spring means are mounted in the camera under a pre-stress so that, upon engagement by the gripper, the spring force rises considerably throughout a relatively short way of compression.

References Cited
UNITED STATES PATENTS

| | | | |
|---|---|---|---|
| 2,605,674 | 8/1952 | Bouma | 352—194 X |
| 2,451,452 | 10/1948 | Thunberg | 352—194 |

SAMUEL S. MATTHEWS, Primary Examiner

M. H. HAYES, Assistant Examiner

U.S. Cl. X.R.

226—60, 62